Sept. 15, 1931.    H. W. HOUCK    1,823,492
CONDENSER TESTING EQUIPMENT
Filed Feb. 25, 1927
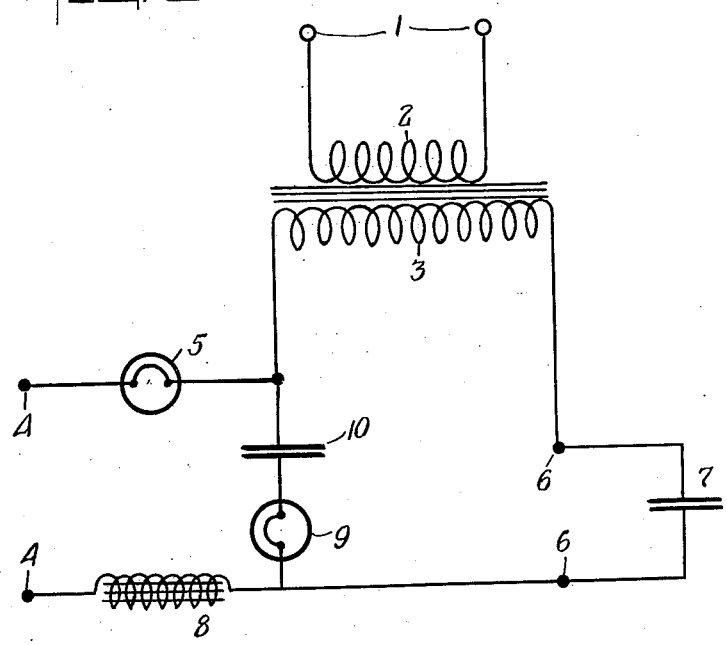
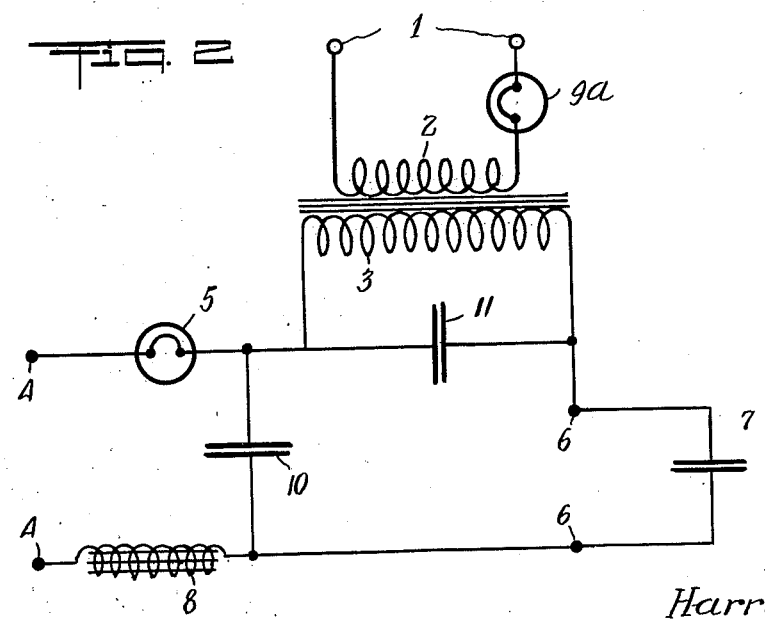
INVENTOR.
Harry W. Houck
BY William F. Nickel
ATTORNEY Patented Sept. 15, 1931

1,823,492

UNITED STATES PATENT OFFICE

HARRY W. HOUCK, OF NEW YORK, N. Y., ASSIGNOR TO DUBILIER CONDENSER CORPORATION, OF NEW YORK, N. Y., A CORPORATION OF DELAWARE

CONDENSER TESTING EQUIPMENT

Application filed February 25, 1927. Serial No. 170,944.

This invention relates to apparatus for testing condensers, particularly electrical condensers.

An important object of my invention is to provide a method for testing electrical impedance devices, such as electrostatic condensers, to determine the electrical condition and characteristics of such devices; preferably, both continuous and discontinuous currents being used in such test.

Another object of the invention is to provide electrical apparatus by which the operative condition of an electrical condenser can be ascertained at once, so that whether the condenser is good, or short-circuited or open-circuited, can be readily discovered. Preferably, the apparatus comprises a circuit in which the condenser to be tested is placed. This circuit is connected to receive both continuous and discontinuous current, and the apparatus also includes devices for indicating the condition of the condenser which is being subjected to examination.

Further objects and advantages of the invention are set forth in the description, and the novel features are pointed out in the appended claims, but I reserve the right to make any changes which do not depart from the principle of the invention or fall without the meanings of the broad terms in which the appended claims are expressed.

On the drawings, Figure 1 shows one arrangement according to my invention, and

Figure 2 shows another arrangement by which my invention can be practiced.

The same numerals identify the same parts throughout.

Referring first to Figure 1, I use the numeral 1 to indicate the terminals of a circuit for supplying the discontinuous current such as alternating current. To the terminals 1 is joined the primary winding 2 of a transformer, which also comprises a secondary winding 3. The numeral 4 indicates terminals to which a source of continuous or direct current can be attached. One terminal of the secondary winding 3 is connected to one of the terminals 4 through an indicating device such as an incandescent light lamp 5. The other terminal of the secondary 3 is connected to one of a pair of terminals 6, across which the condenser 7 to be tested is placed. The other terminal 6 is connected to the remaining terminal 4 through a choke coil 8. Across the lamp 5 and coil 8 and between the same and the secondary winding 3 and condenser 7, I connect another indicating device or lamp 9 and another condenser 10 in series.

In practice when the primary winding 2 is connected to a source of alternating current, and the terminals 4 to a source of direct current, if the condenser 7 is in good operaive condition, direct current cannot flow through the circuit of the winding 3 and condenser 7; but alternating current will flow through the circuit including the condenser 7, lamp 9, and condenser 10, with the result that lamp 9 alone lights and lamp 5 remains dark. If the condenser 7 is open-circuited so that it does not work at all, no alternating current can flow through the winding 3, and in this instance, the lamp 9 remains dark as well as the lamp 5. On the other hand, if the condenser 7 is short-circuited, it can be traversed by both alternating current from the coil 3, which will cause the light 9 to light up, and by some direct current also, passing through the coil 3 to the condenser. Thus the lamp 5 will also be illuminated, so that both lamps 5 and 9 light up together. Hence the condition of the condenser 7 can be told, according as the lamp 9 illuminates while the lamp 5 remains dark; or both lamps remain dark or both light up simultaneously.

In Figure 2 the arrangement is similar except that the condenser 10 alone is bridged across between the coil 8 and lamp 5. Lamp 9 instead of being in series with the condenser 10 is put in the circuit of the primary 2 as indicated at 9a. A third condenser 11 is bridged across the terminals of the secondary winding 3 to reduce the current in the primary to the minimum when the condenser 7 is open circuited. This arrangement works the same as before so that when the condenser 7 is short-circuited, both lamps will light; when it is open neither will light, and when the condenser is in good operative condition the lamp 9a alone will light.

Having described my invention, what I believe to be new and desire to secure and protect by Letters Patent of the United States is:

1. Apparatus for testing condensers, comprising a circuit for receiving alternating current, an indicating device to be included in said circuit and to be operated by said alternating current, and connections for supplying direct current to said circuit, with an indicating device in said connections to be energized by said direct current.

2. Apparatus for testing a condenser, comprising a circuit for alternating current, the condenser to be included in said circuit, an indicating device to be included in said circuit, connections for supplying direct current to said circuit, and another indicating device in said connections to be energized by said direct current.

3. The method of testing capacitative elements which comprises impressing simultaneously a plurality of currents of different characteristics upon a capacitative element and a plurality of indicating means, and determining from the indicating means the condition of the element under test.

4. The method of testing condensers which comprises impressing continuous and alternating currents simultaneously upon indicating devices in circuit relation with a condenser under test, and determining from such indicating devices the condition of the condenser.

5. A system for testing condensers comprising a direct current circuit and an alternating current circuit, a condenser under test connected in common to both circuits, a device in the direct current circuit adapted to indicate whether the condenser is short-circuited, and a device in the alternating current circuit adapted to indicate whether the condenser is open.

In testimony whereof I affix my signature.

HARRY W. HOUCK.